W. J. REYNOLDS.
FRYING PAN.
APPLICATION FILED MAR. 25, 1912.
1,068,274.
Patented July 22, 1913.
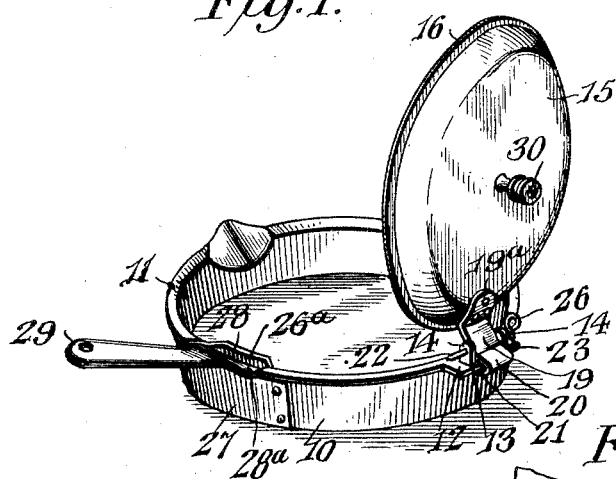
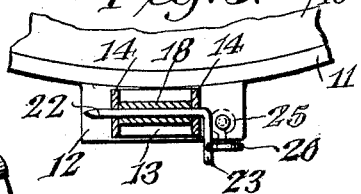
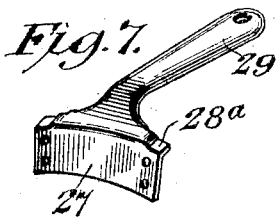
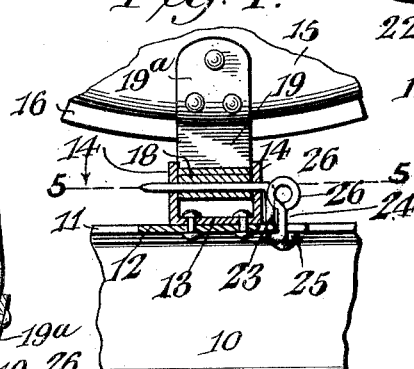
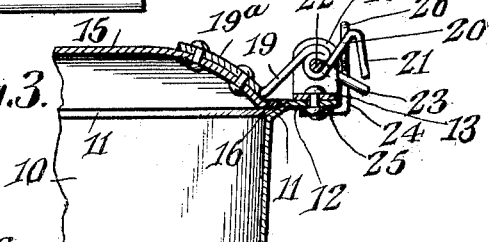
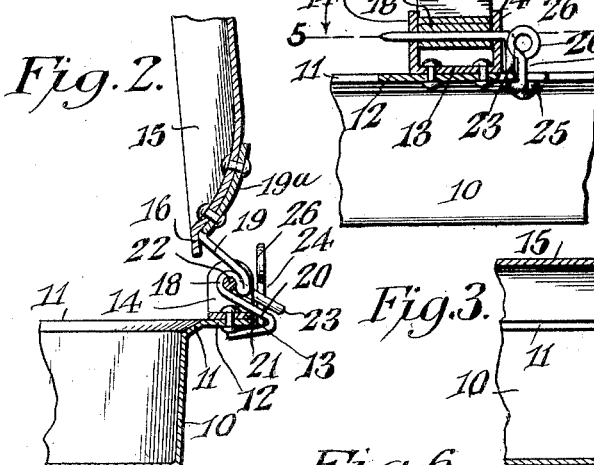
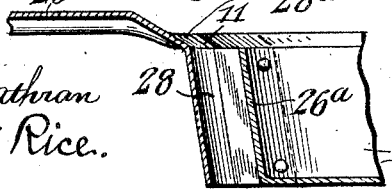
Walter J. Reynolds
INVENTOR
WITNESSES
BY
ATTORNEY

UNITED STATES PATENT OFFICE.

WALTER J. REYNOLDS, OF PROVIDENCE, RHODE ISLAND.

FRYING-PAN.

1,068,274.　　　　　Specification of Letters Patent.　　Patented July 22, 1913.

Application filed March 25, 1912. Serial No. 686,026.

*To all whom it may concern:*

Be it known that I, WALTER J. REYNOLDS, a citizen of the United States, residing at Providence, in the county of Providence and State of Rhode Island, have invented a new and useful Frying-Pan, of which the following is a specification.

My invention relates to improvements in frying pans, and has for its object to provide a frying pan which is provided with a cover that can be instantly swung to and positively held in a raised position and be quickly lowered by simply pressing down on the cover. The cover is so mounted as to be easily removable for the purpose of washing, etc., and can be as easily replaced when desired. Further, the cover is so supported in a raised position that all the drippings from the cooking that collect on the cover will drain back into the pan.

A further improvement consists in bending inwardly at a certain point the side of the pan to form a part of the walls of the fume flue. This preserves the continuity of the pan and avoids the insertion of a separate piece and also obviates sharp corners and openings to collect dirt which it is difficult to reach in cleaning.

Other objects and advantages of my invention will appear in the course of the following description.

In the accompanying drawings:—Figure 1 is a perspective view of my improved frying pan with the cover in a raised position. Fig. 2 is a fragmentary vertical sectional view of the pan showing the cover in a raised position. Fig. 3 is a view similar to Fig. 2 but showing the cover in a closed position. Fig. 4 is a view, partly in section, through the pivot of the cover and looking toward the back of the cover when raised. Fig. 5 is a top plan view, partly in section, taken on the line 5—5 of Fig. 4. Fig. 6 is a fragmentary sectional view taken through the fume flue and handle. Fig. 7 is a detail view of the handle and metal section forming the outer wall of the odor flue.

Referring to the drawings, which illustrate the preferred embodiment of my invention, 10 designates the body of the pan, which is preferably circular in form and stamped from suitable sheet metal to secure strength and lightness. As illustrated, the sides of the pan are preferably slightly outwardly inclined, and at their upper edge terminate in an outwardly and upwardly flared or beveled flange 11.

At a point on its circumference diametrically opposite the usual pouring lip, the flange is provided with an outstanding horizontally-disposed projection 12 constituting a platform or support. Mounted on the projection is a bracket 13, the body portion of which is secured by rivets or other securing means thereto. The parallel spaced-apart, oppositely-disposed lugs or arms 14 of the bracket are each provided with a centrally-disposed opening, which openings are in alinement for a purpose to be hereinafter explained.

Adapted to fit over the top of the body 10 of the frying pan is a round, dish-shaped cover 15, provided around its circumference with a horizontal flange 16, which rests on the flange 11 of the body when the cover is closed. The hinge for the cover is formed from a strip of spring sheet metal, folded or bent transversely intermediate its ends to form a circular hinge-eye 18, from which project the oppositely-disposed arms or leaves 19 and 20. The arm 19 normally extends in a downward direction from the hinge eye to the cover 15, and is then bent upwardly to form a section 19ª which conforms to the shape of the top of the cover to which it is riveted. The other arm 20, which will hereinafter be referred to as the free or spring arm, when in its normal position, is extended outwardly and upwardly to a point above the pivot of the hinge and to a point beyond the outer edge of the projection 12, and is then bent downwardly and slightly outwardly to form an engaging lip 21, the general shape of the arm being substantially V-shaped.

Adapted to be removably thrust through the alined openings in the lugs 14 of the bracket 13 and the hinge eye 18 is a pintle rod 22, one end of which is bent at right angles to form an angular head 23. In order to hold the pintle rod against accidental displacement, a spring wire retainer 24 has one end bent under the projection 12 and curved around to form a ring 25 which is secured in position by a rivet. The retainer extends up vertically from the support and is bent around to form a second ring 26, which is arranged parallel with the outer edge of the projection and has one side close to but out of alinement with one of the lugs 14. The angularly disposed head 23 of the pintle rod is turned down past the ring 26, and the retainer has sufficient spring to admit of this when the ring 26 will return to its normal position, thereby locking the pintle rod in position between the lug 14 and the retainer.

At a point on its circumference the wall or side of the body 10 of the frying pan is bent inwardly or inset at 26ª to form the side and ends of a flue, the outer side of which is closed by a section 27, which conforms to the general contour of the outside of the pan, and is riveted in position near the ends of the inset portion, thereby forming an odor flue 28 open at its top and bottom. As shown, the section 27 at its upper edge is flanged outwardly as at 28ª to form a continuation of the flange 11 of the body 10 of the frying pan. The outwardly flanged portion 28ª extends beneath the flange 11 of the pan at the sides of the inset portion 26ª, and that portion of the flange of the section 27 lying between the spaced-apart ends of the flange 11 is bent up until its top is substantially flush with the upper face of the flange of the pan. That portion of the flange 28ª lying between the spaced-apart ends of the flange 11 is extended outwardly and slightly upwardly and reduced in width and properly shaped to form a handle 29 for the frying pan.

From the foregoing it will be seen that I have provided a cover 15, which by taking hold of the knob 30, can be instantly swung to a raised or vertical position. The upward movement of the cover will be limited by the lower side of the free arm 20 contacting with the bracket 13, and the cover will be retained in its raised position by the inner face of the lip 21 contacting with the lower outer edge of the projection 12, in which position it will be held until it is pressed down against the resistance of the spring of the hinge.

What I claim is:—

1. A frying pan provided with a cover, a strip provided with a hinge eye at an intermediate point of its length and having a portion at one side of the hinge eye rigidly connected to the cover, the remaining portion of the strip at the other side of the said eye constituting an extended free spring arm, engaging means carried by the free spring arm and adapted, when the cover is raised, to engage a fixed part of the pan to maintain said cover in a raised position, and means for hinging the eye to said pan.

2. A frying pan provided with a cover, a projection carried by said frying pan, a bracket mounted on said projection, and a strip pivotally mounted intermediate its ends on said bracket, said strip comprising an arm rigidly connected to said cover at one side of said pivot point and an extended free spring arm at the other side of said pivot point, and engaging means carried by the free spring arm and adapted to engage said projection when the cover is raised to maintain the latter in an elevated position.

3. A frying pan provided with a cover, an outwardly extending projection at the upper edge of said frying pan, and a strip pivotally mounted at a point intermediate its ends on said projection, said strip comprising an arm connected to the cover at one side of said pivot point and an extended free spring arm at the other side of said pivot point, said free arm being bent to form a lip whereby when the cover is raised said lip will engage said projection to maintain the cover in a raised position.

4. A frying pan provided with a cover, a horizontally disposed projection carried by said pan, and a strip pivotally mounted at a point intermediate its ends on said projection, said strip comprising a cover-engaging arm at one side of said pivot point and a free spring arm at the other side of said pivot point, the end of said free spring arm being bent to form a downwardly extending lip which is adapted when the cover is raised to engage said projection to maintain the cover in a raised position.

5. A frying pan provided with a cover, a horizontally-disposed projection carried by said pan, spaced-apart, oppositely-disposed lugs mounted on said projection, a strip of spring metal bent transversely intermediate of its ends to form a hinge-eye, a pintle rod passed through said hinge-eye to pivot said strip between said lugs, a cover engaging arm and a free spring arm extending in opposite directions from said hinge-eye, a downwardly-extending lip carried by said free arm, said lip being so positioned from said pintle rod with respect to the underside of said projection as to engage therewith when swung thereunder, whereby when said cover is raised said free arm will maintain said cover in a raised position.

6. A frying pan provided with a cover, a lateral projection carried by said frying pan, upstanding lugs mounted on said projection, a hinged strip for connecting the cover to the lugs and provided with a suitable hinge-eye, a pintle rod passed through said lugs and said hinge-eye, an angularly-disposed head formed at one end of said pintle rod and positioned outside of one of said lugs, an upstanding spring wire retainer mounted out of line with said pintle rod but within the radius of movement of said angularly-disposed head, a ring at the upper end of said retainer, said ring being spaced from said lug, whereby when said angularly-disposed head of the pintle rod is pushed down against said ring the latter will spring to one side to permit said angularly-disposed head to pass but will spring back to lock said angularly-disposed head of the pintle rod in position.

In testimony that I claim the foregoing as my own, I have hereto affixed my signature in the presence of two witnesses.

WALTER J. REYNOLDS.

Witnesses:
 HARRY L. SAUNDERS,
 CHARLES H. TITUS.

Copies of this patent may be obtained for five cents each, by addressing the "Commissioner of Patents, Washington, D. C."